(12) United States Patent
Dougherty et al.

(10) Patent No.: US 6,988,403 B2
(45) Date of Patent: Jan. 24, 2006

(54) FLUID LEVEL MEASURING DEVICE

(75) Inventors: John Michael Dougherty, Clark, MO (US); Karen S. Slabaugh, Columbia, SC (US); Steven Marek, Moberly, MO (US)

(73) Assignee: Orscheln Products LLC, Moberly, MO (US)

( * ) Notice: Subject to any disclaimer, the term of this patent is extended or adjusted under 35 U.S.C. 154(b) by 0 days.

(21) Appl. No.: 10/261,854

(22) Filed: Oct. 1, 2002

(65) Prior Publication Data

US 2003/0061875 A1    Apr. 3, 2003

Related U.S. Application Data

(60) Provisional application No. 60/326,636, filed on Oct. 1, 2001.

(51) Int. Cl.
*G01F 23/00*    (2006.01)

(52) U.S. Cl. .................... 73/290 B; 184/105

(58) Field of Classification Search ........... 73/290 B; 33/722, 728, 719, 730, 731, 726, 729; 184/105.1; 116/227; 220/86.2
See application file for complete search history.

(56) References Cited

U.S. PATENT DOCUMENTS

| | | | |
|---|---|---|---|
| 1,456,333 A | 5/1923 | Nelson | |
| 1,550,302 A | 8/1925 | Zarobsky | |
| 1,593,847 A | 7/1926 | Reid | |
| 1,681,431 A | 8/1928 | Pribil | |
| 1,697,814 A | 1/1929 | Forbes | |
| 1,781,534 A | 11/1930 | Bertschinger | |
| 1,864,138 A | 6/1932 | Machonis | |
| 1,887,700 A | 11/1932 | Stevens | |
| D105,723 S | 8/1937 | Wheaton | |
| 2,239,402 A | 4/1941 | Sachs | |
| 2,333,838 A | 11/1943 | Wilson | |
| 2,443,294 A | 6/1948 | Bickle | |
| 2,474,805 A | 7/1949 | Coderre | |
| 2,663,084 A | 12/1953 | Coderre | |
| 2,705,372 A | 4/1955 | Cornell | |
| 2,879,914 A | 3/1959 | Fleckenstein | |
| D201,327 S | 6/1965 | Hori et al. | |
| D205,975 S | 10/1966 | Sato | |
| 3,296,703 A | 1/1967 | Stade et al. | |
| 3,349,944 A | 10/1967 | Moeller | |
| 3,371,418 A | 3/1968 | Moeller | |
| 3,377,708 A * | 4/1968 | Gassman et al. ............. 33/727 |

(Continued)

FOREIGN PATENT DOCUMENTS

DE    419886    10/1925

(Continued)

OTHER PUBLICATIONS

Miller Products Company Home Page, May 17, 2001, http://www.moellerproducts.com.*

*Primary Examiner*—Hezron Williams
*Assistant Examiner*—André K. Jackson

(57) ABSTRACT

A fluid level measuring device, also referred to as a dipstick, for measuring the fluid level in a fluid reservoir or tank, such as an oil pan or transmission reservoir in an internal combustion engine. The fluid level measuring device includes a stationary tube assembly in which a rotatable dipstick assembly is disposed. The dipstick assembly includes a fluid level indicator measuring blade attached to an elongated shaft that is molded into a plastic handle assembly. The plastic handle assembly includes a bayonet type locking mechanism for locking the handle to the stationary tube assembly. A compressible seal forms a pressurized seal between the stationary tube assembly and the handle.

9 Claims, 5 Drawing Sheets

U.S. PATENT DOCUMENTS

| | | |
|---|---|---|
| RE26,422 E | 7/1968 | Stade et al. |
| 3,474,884 A | 10/1969 | Braun |
| 3,488,855 A | 1/1970 | Howe |
| 3,594,906 A | 7/1971 | Kerfoot |
| 3,626,596 A | 12/1971 | Manke |
| 3,662,470 A | 5/1972 | Sasgen |
| 3,703,038 A | 11/1972 | Smith |
| 3,722,102 A | 3/1973 | Jackson et al. |
| 3,738,176 A | 6/1973 | Kerfoot |
| 3,739,933 A | 6/1973 | Degaetano |
| 3,885,317 A | 5/1975 | Karls |
| 3,913,783 A | 10/1975 | Cooper |
| 3,927,783 A | 12/1975 | Bogert |
| 3,972,234 A | 8/1976 | Osojnak |
| 3,991,476 A | 11/1976 | Haines |
| 4,021,924 A | 5/1977 | Haines |
| 4,055,898 A | 11/1977 | Braun et al. |
| 4,072,245 A | 2/1978 | Sloan, Jr. |
| 4,102,472 A | 7/1978 | Sloan, Jr. |
| 4,110,909 A | 9/1978 | Mayr et al. |
| 4,113,138 A | 9/1978 | Fields et al. |
| D250,467 S | 12/1978 | O'Banion |
| D250,468 S | 12/1978 | O'Banion |
| 4,155,166 A | 5/1979 | Rochow et al. |
| 4,168,011 A | 9/1979 | Lomer |
| 4,235,186 A | 11/1980 | Frobose |
| 4,266,344 A | 5/1981 | Richardson |
| D259,489 S | 6/1981 | Herenius |
| 4,276,694 A | 7/1981 | Richardson |
| 4,331,185 A | 5/1982 | Rinaldo et al. |
| 4,363,336 A | 12/1982 | Cerrato |
| 4,368,579 A | 1/1983 | Bauer |
| 4,392,583 A | 7/1983 | Wong |
| 4,406,301 A | 9/1983 | Cerrato |
| D274,620 S | 7/1984 | Murakami et al. |
| 4,498,599 A | 2/1985 | Avrea |
| 4,510,690 A | 4/1985 | Attler |
| 4,516,688 A | 5/1985 | Freeland |
| 4,531,293 A | 7/1985 | Grinde |
| 4,596,141 A | 6/1986 | Kondo |
| 4,640,126 A | 2/1987 | Jansch |
| 4,717,119 A | 1/1988 | Trin |
| 4,761,886 A | 8/1988 | Wilson et al. |
| 4,779,876 A | 10/1988 | Novosad |
| D305,028 S | 12/1989 | Sherwood et al. |
| 4,902,043 A | 2/1990 | Zillig et al. |
| 4,941,268 A | 7/1990 | Tausk |
| 4,965,942 A | 10/1990 | Hoszowski |
| 4,988,975 A | 1/1991 | Nap |
| 4,991,436 A | 2/1991 | Roling |
| 5,007,287 A | 4/1991 | Nagai |
| 5,014,445 A | 5/1991 | Martell |
| 5,022,495 A | 6/1991 | Lavender |
| 5,036,996 A | 8/1991 | Epstein |
| D320,562 S | 10/1991 | Brester et al. |
| 5,071,020 A | 12/1991 | Reutter |
| 5,080,082 A | 1/1992 | Mueller et al. |
| 5,086,943 A | 2/1992 | Poskie |
| 5,094,008 A | 3/1992 | Murphy et al. |
| 5,160,021 A | 11/1992 | Sibley et al. |
| D348,645 S | 7/1994 | Hitchcock et al. |
| 5,325,981 A | 7/1994 | Klomhaus et al. |
| 5,335,641 A | 8/1994 | Schnabel |
| 5,361,924 A | 11/1994 | Muller |
| 5,466,020 A | 11/1995 | Page et al. |
| 5,485,681 A | 1/1996 | Hitchcock |
| 5,535,849 A | 7/1996 | Few |
| 5,564,177 A | 10/1996 | Fernandes et al. |
| 5,613,303 A | 3/1997 | Kayano et al. |
| 5,829,153 A | 11/1998 | Hitchock |
| 6,314,808 B1 | 11/2001 | Williams et al. |
| 6,453,740 B1 | 9/2002 | Williams et al. |

FOREIGN PATENT DOCUMENTS

| | | |
|---|---|---|
| DE | 26 17 150 A1 | 4/1976 |
| DE | 4122288 | 3/1992 |
| DE | 297 09 019 U1 | 5/1997 |
| EP | 0 547 384 A1 | 11/1992 |
| FR | 771315 | 6/1933 |
| FR | 1458582 | 10/1966 |
| FR | 2 714 178 A1 | 12/1993 |
| FR | 2715224 | 7/1995 |
| GB | 1 201 671 | 2/1968 |
| GB | 2 096 320 A | 10/1982 |
| GB | 2 266 590 A | 4/1992 |
| JP | 0296115 | 11/1989 |

\* cited by examiner

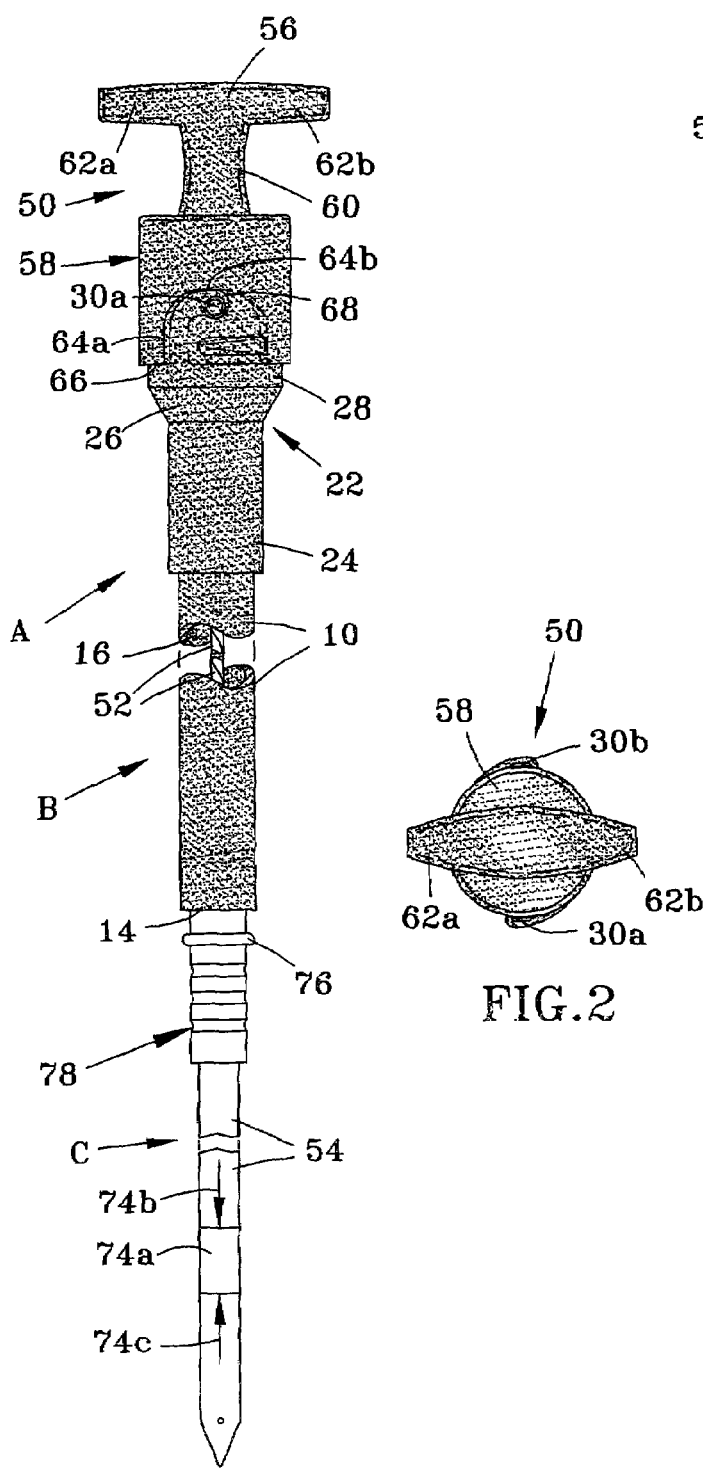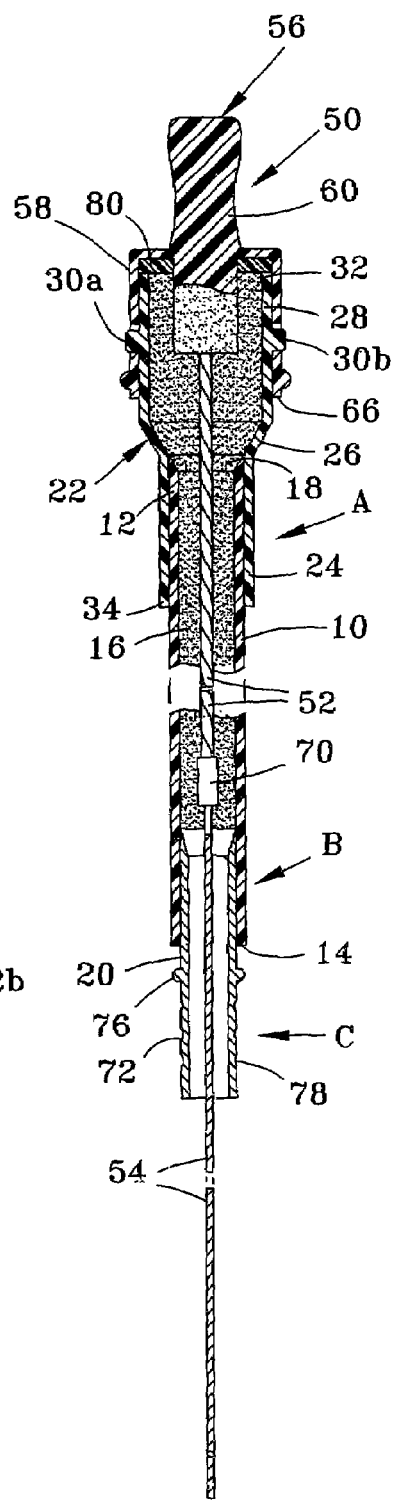
FIG.1  FIG.2  FIG.3

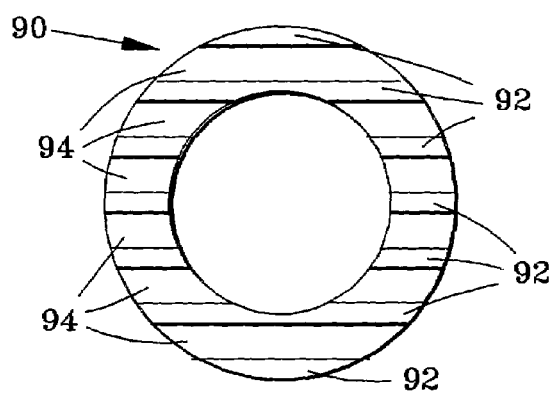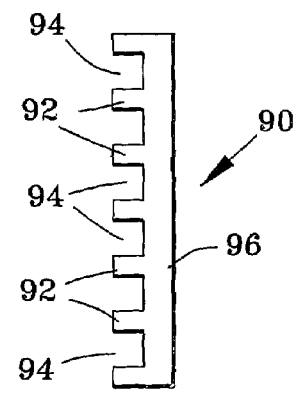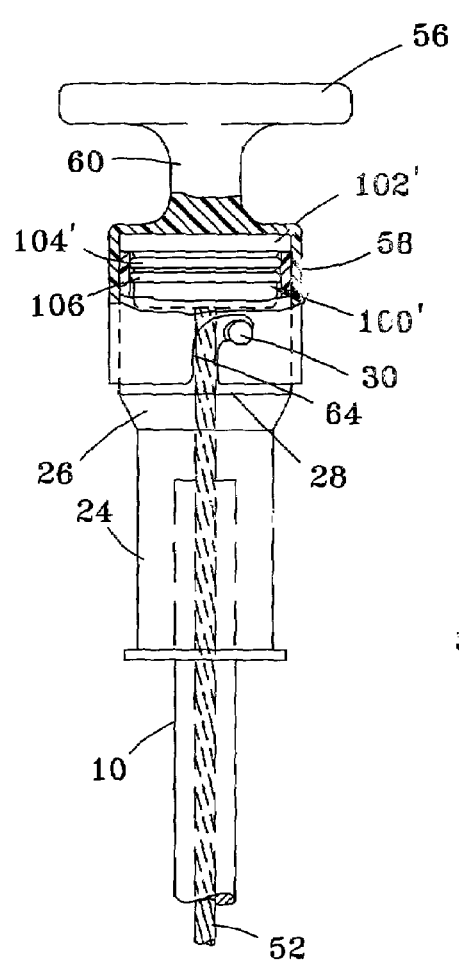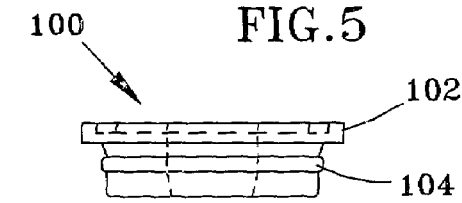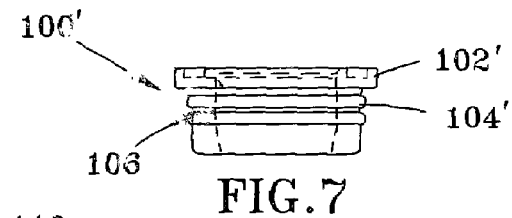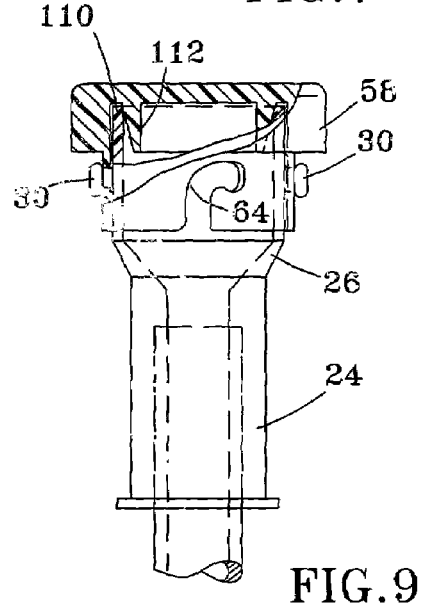

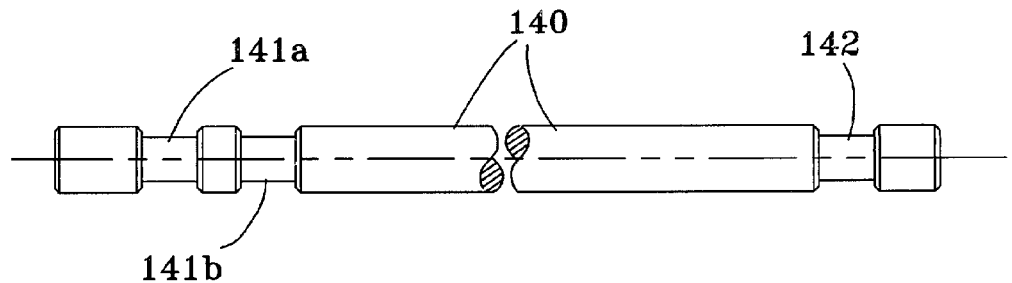
FIG.11
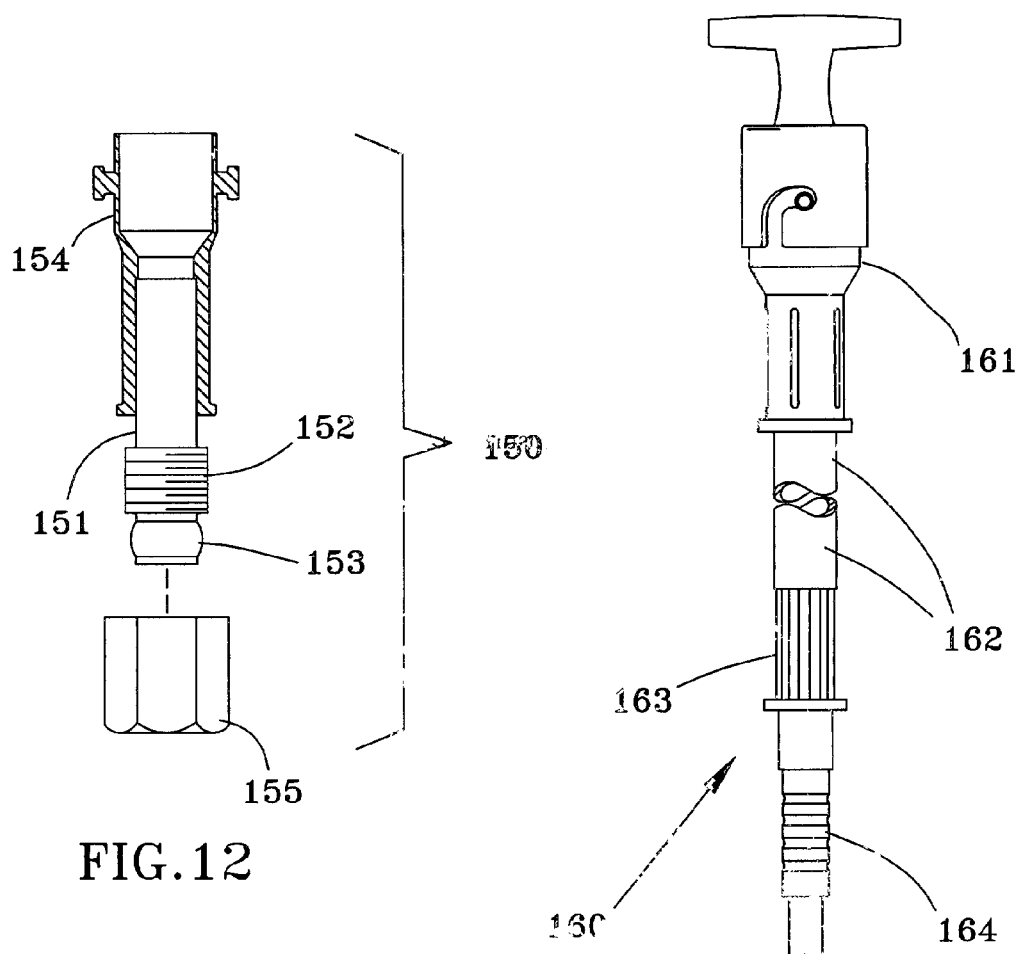
FIG.12
FIG.13

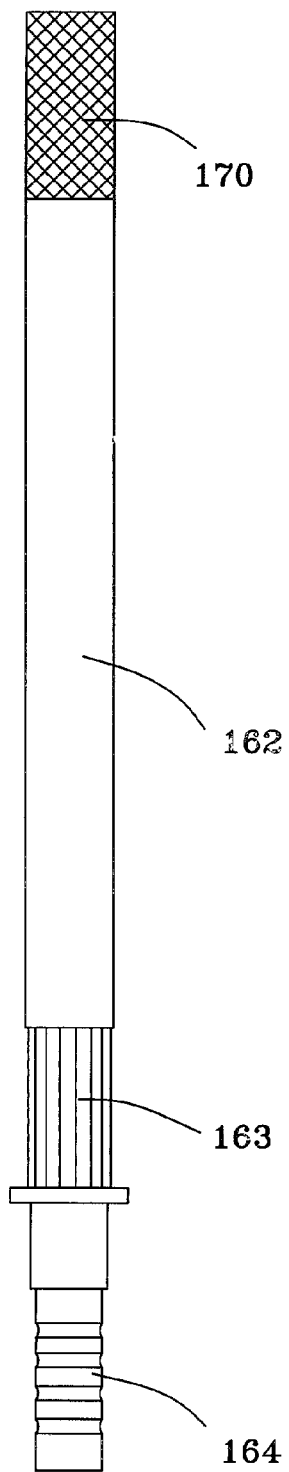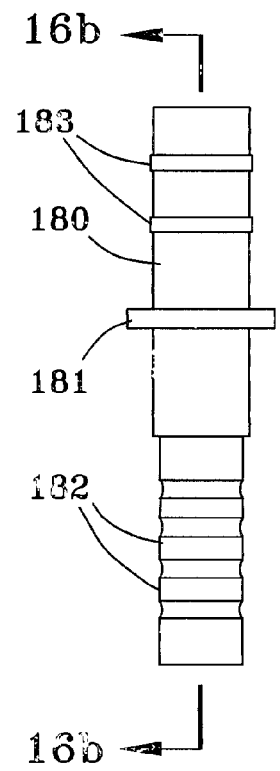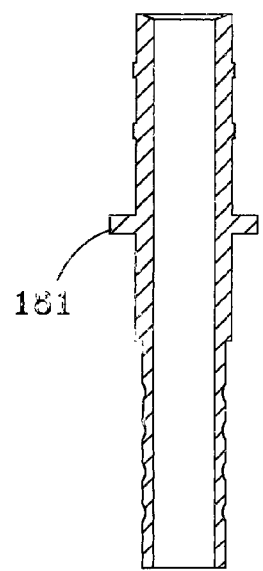
FIG.14
FIG.15
FIG.16a
FIG.16b

FLUID LEVEL MEASURING DEVICE

CROSS-REFERENCE TO RELATED PATENTS AND PATENT APPLICATIONS

The subject matter of the invention is related to U.S. Pat. No. 6,314,808, filed on Nov. 24, 1997, and U.S. Pat. No. 6,453,740, filed on Sep. 05, 2001; both entitled "Fluid Level Measuring Device". The disclosure of these patents is hereby incorporated by reference.

The subject matter herein claims benefit under 35 U.S.C. Section 119(e) of U.S. Patent Application Ser. No. 60/326,636, filed Oct. 01, 2001, and entitled "Fluid Level Measuring Device"; the disclosure of which is hereby incorporated by reference.

FIELD OF THE INVENTION

The subject invention is directed to a device used to measure fluid levels, and more particularly, to dipsticks used to measure fluid levels by contacting an indicator at one end of the dipstick into a fluid holding compartment.

BACKGROUND OF THE INVENTION

With internal combustion engines, transmissions, and other machinery requiring fluids for lubrication and cooling, it is known to use a fluid measuring device for indicating the fluid level in a selected fluid holding compartment. Typically, the fluid measuring device is a dipstick for checking the level of fluid such as engine or transmission oil, or hydraulic fluid within one of the many fluid holding compartments in the engine, transmission, or other machine. The dipstick is normally an elongated indicator that is slidably located within a conduit or pipe attached to the engine, transmission, gear box, reservoir or machine in which a fluid level indication is desired. When the dipstick is fully inserted into the conduit, one end is immersed into the fluid. When an actual reading of the fluid level is desired, the other end of the dipstick is pulled from the conduit thereby removing the entire dipstick from the conduit to allow the user to read the fluid level from the one end. The dipstick is then reinserted into the fluid compartment once the fluid level has been checked.

Traditional fluid level indicator systems typically consist of a two piece system with a holding tube and a dipstick. Examples of conventional dipstick systems are disclosed in U.S. Pat. Nos. 3,371,418; 5,485,681 and 5,829,153; the disclosure of each of which is hereby incorporated by reference. The holding tubes are generally fabricated from metal tubing and require various forming operations including bending, flaring, and machining, followed by the attachment of a dipstick receptacle. In addition, the dipstick is fabricated from multiple components including a handle, washer, cap, rubber stopper, shaft assembly, and a marked spring steel shaft mechanically joined to a spring steel blade. The actual assembly of these various components involves multiple assembly operations requiring costly, time-consuming, and labor intensive manufacturing steps. Therefore, a simpler design requiring fewer parts and connections as well as less forming is desirable.

In addition, today's engines, transmissions, and machinery designs are smaller, more compact, and of less weight than traditional engines, transmissions, and machinery. Therefore, fluid level indicator systems must be smaller, more compact, and lighter weight. Moreover, the fluid access routes or paths through which the fluid level indicator system accesses the fluid storage compartments are becoming more complex (more twists and turns as well as longer runs), smaller, and more compact.

There is a need in this art for smaller and lighter weight fluid level indicator systems with improved flexibility. There is also a need for a fluid level indicator system allowing access to the fluid compartment while assuring a secure, sealed closure of the access when fluid level determinations are not being made and/or additional fluid is not being added. This sealed closure would prevent unnecessary loss of the fluids during operation as well as supply level pressurization. Moreover, a positive indication that the dipstick is securely in place is desirable.

SUMMARY OF THE INVENTION

The instant invention solves problems associated with conventional fluid level measuring systems by providing a handle associated with a dipstick that is free to swivel or rotate freely within a plastic handle. By being able to rotate (e.g., while being inserted through a non-linear tube and into an engine component), the dipstick can accommodate travel along non-linear routes without binding or being permanently deformed.

The fluid level measuring device includes a stationary tube assembly extending from the fluid compartment in which a dipstick is disposed. The dipstick includes a plastic handle that is joined or molded to one end of a shaft, such as a flexible spring steel wire shaft. If desired, a mold release agent can be applied upon a portion of the shaft in order to prevent the over-molded handle from permanently bonding to the shaft. A precision stamped fluid level indicator blade extends from a second end of the shaft and is preferably attached to the shaft by either die casting, spin welding, ultrasonic welding, or other bonding means, or by means of a fitting or other connector. The tube assembly is preferably made of a plastic material with an enlarged end. Lugs extend from the end and provide a bayonet interconnection between the tube and the handle assembly by twisting the handle assembly relative to the tube. The lugs can extend inwardly or outwardly depending upon the design of the handle, e.g., the handle can be inserted into an enlarged opening of the stationary tube or about the end of the stationary tube. This causes inter-engagement of the lugs with slots in the handle. An engine fitting (e.g, a steel engine fitting) extends from the tube and serves to guide the indicator blade to an appropriate location within the fluid cavity. Alternatively, the tube can include at least one O-ring or other seal that engages a protuberance/ridge defined around the tube in order to provide an interference or compression fit into a reservoir.

The instant invention also solves problems associated with conventional manufacturing methods by staking an engine fitting at the end of the stationary tube associated with the fluid level measuring device. The tube can be shaped or bent into a wide range of linear or non-linear configurations. Typically the tube comprises commercial grade steel.

A gasket acts as a pressure lock seal for sealing the handle to the enlarged end when the lugs are locked in the slots. This pressure lock seal serves to allow significant pressurization within the dipstick and oil pan or other chamber the dipstick is affixed to. The gasket can also urge the bayonet connection of the handle into a locked position relatively to the lugs on the stationary tube.

The bayonet interconnection in unison with the gasket supplies an actual pressurized seal thereby allowing pressurized testing of the combustion engine, transmission, or other machinery without either removal of the dipstick or attempts at sealing the dipstick. Furthermore, a sealed dipstick allows the combustion engine, transmission, or other machinery to run at the intended pressure rather than either below the intended pressure or at the intended pressure due to an adjustment.

The structure is manufactured from lightweight, corrosion-resistant, plastic materials such as nylon, glass-reinforced nylon, among other oil, water and temperature resistant thermoplastic materials, with the exception of the metallic shaft, attachment fitting, blade, and metal engine fitting. The metallic shaft can be fabricated from stainless steel, zinc plated, phosphated, chromated, among other metal treatments to improved corrosion resistance. The seal and locking engagement between the handle and enlarged end preferably involves a quarter-turn sealing motion with an improved sealing capability and a positive lock feature.

In one aspect of the invention, the fluid level indicating system is capable of being in fluid communication with the combustion engine, transmission, or other machinery to which it is affixed while maintaining a constant pressurization therein through an improved method of sealing. Specifically, a seal that is capable of maintaining several atmospheres (at least 1 to 1.5 atm.) of back pressure is desirable. The inventive seal can also serve to reduce emissions from the associated engine, e.g., reducing emissions from the dipstick tube of a diesel engine in order to satisfy environmental regulations.

In another aspect, the invention provides a positive engaging, yet easy to use, locking arrangement for securely locking and sealing the dipstick within or over the tube with an easy motion. It is also desirable that this sealing of the dipstick within the tube is such that the tube may be pressurized to the same back pressure as the combustion engine, transmission, or other machinery.

In a further aspect, the invention provides a smaller and more compact fluid level indicating system which has improved flexibility for routing of the fluid level indicator system in and around the complex design of today's engines, transmissions, and machinery.

The instant invention can also be employed as a kit or an assemblage in order to retrofit existing dipstick systems. When employed as a retro-fit, the inventive dipstick system provides the same advantages as if installed as an original equipment dipstick.

Regardless of which aspect of the invention is employed, the instant invention provides a more corrosion-resistant, lighter weight, less complex, higher precision and more cost effective fluid level indicator system.

Still other advantages and benefits of the invention will become apparent to those skilled in the art upon a reading an understanding of the following detailed description.

BRIEF DESCRIPTION OF THE DRAWINGS

The invention may take physical form in certain parts and arrangements of parts, certain aspects and method of which will be described in detail in this specification and illustrated in the accompanying drawings that form a part hereof. Any dimensions shown on the Figures are for illustration purposes only, and the components shown in these Figures can be employed in a wide range of dimensions and configurations.

FIG. 1 is a side view of the fluid level measuring device including the stationary tube assembly with a dipstick inserted therein having a handle attached to one end thereof;

FIG. 2 is a top view of the fluid level measuring device;

FIG. 3 is a partial sectional view of the fluid measuring device of FIG. 1;

FIGS. 4 and 5 are front and side elevational views, respectively, of another preferred sealing gasket;

FIGS. 6 and 7 are elevational views of further preferred embodiments of grommet seals;

FIG. 8 is an elevational view, in partial cross-section, of the end of the dipstick assembly using the seal of FIG. 7 received on the tube assembly; and FIG. 9 is an elevational view of the end of the dipstick assembly incorporating yet another preferred grommet embodiment for sealing the end of the tube assembly.

FIG. 11 is a side view of a shaft that is rotatably mounted within a handle.

FIG. 12 is an exploded side view of a fluid level measuring device that can be retrofit to replace an existing fluid level measuring assembly.

FIG. 13 is a side view of the fluid level measuring device including the stationary tube assembly with a dipstick inserted therein having a handle attached to one end thereof and a staked engine fitting at the other end.

FIG. 14 is a side view of the stationary tube assembly of FIG. 13 and an associated staked engine fitting.

FIG. 15 is a side view and cross-sectional drawing of the stationary tube illustrated in FIGS. 13 and 14.

FIG. 16 is a side view and cross-sectional drawing of the engine fitting illustrated in FIGS. 13 and 14.

DETAILED DESCRIPTION

Figure 10:
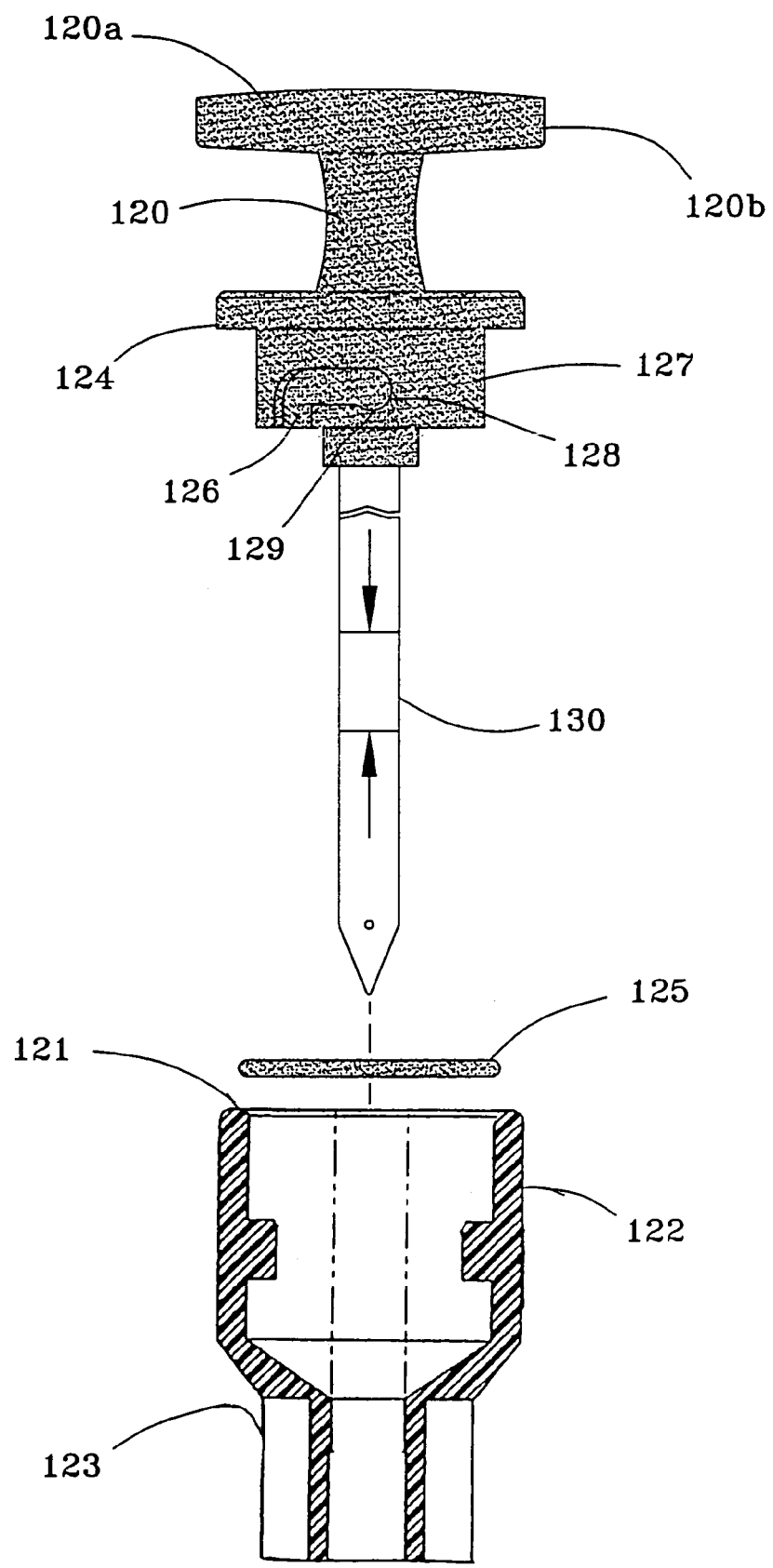
FIG. 10 is an exploded side view of the fluid level measuring device including the stationary tube assembly with a dipstick wherein the dipstick handle is inserted within an expanded end of the stationary tube.

One aspect of the instant invention relates to a fluid level indicator system comprising a handle, a rotatably mounted shaft and dipstick mounted within the handle, and a stationary tube having an opening for receiving the handle. The rotatably mounted shaft can be over-molded by the plastic handle in a manner that permits the shaft to rotate (or prevents the plastic from permanently bonding to the shaft). The handle can be received within or around the stationary tube opening.

At least a portion of the shaft is contacted with a fluid that prohibits the over-molding plastic handle from permanently bonding to the shaft. While any suitable material can be employed, examples of suitable materials comprise commercially available injection mold release agents, oils, lubricants, among others capable of preventing a permanent bond between the shaft and over-molded plastic. One material comprises a polymeric carrier such as an acrylic, urethane or epoxy and heat expandable spheres, e.g., butane filled thermoplastic shells such as Expancels® supplied by Akzo-Nobel. The shaft is, for example, dipped into the expandable material, and during the handle plastic over molding process the heated plastic causes the material to expand thereby preventing the thermoplastic from bonding to the shaft. Any bond forming between the expandable material and the shaft can be broken by rotating the shaft. If desired, the fluid can be supplemented or replaced by using a sleeve or material that is consumed during the over-molding process. Alternatively, a roller tube or sleeve can be placed around the shaft such that the over-molding plastic bonds to the pin while allowing shaft to rotate within the tube.

Another aspect of the invention relates to an improved manufacturing method and resultant product wherein the stationary tube is staked onto an engine fitting (the engine fitting guides the shaft and indicator blade into a fluid reservoir such as oil, transmission fluid, among others). This method can be employed for manufacturing fluid level indicators with rotary or stationary shafts. The stationary tube can have a linear or non-linear configuration, and a wide range of lengths. Employing a staking operation to affix an engine fitting onto the stationary tube ensures a fluid tight connection while reducing assembly costs.

Referring now to the drawings wherein the showings are for the purposes of illustrating certain aspects of the invention only and not for purposes of limiting the invention, the overall arrangement of such aspects of the fluid level measuring device A can best be understood by reference to FIGS. 1, 3, and 8–10. As illustrated therein, the fluid level measuring device A comprises a stationary tube assembly B with a dipstick assembly C removably and rotatably disposed therein. Specifically, tube assembly B is an elongated, hollow guide tube 10 with first and second spaced ends 12 and 14 having a through passage 16 that communicates with first and second openings 18 and 20 at the respective first and second ends. The tube can be fabricated from any suitable material. Examples of suitable material comprises steel, aluminum, painted steel, plastic, among others.

The tube assembly B further includes an enlarged diameter coupler or spout 22 attached to the first end 12 of the guide tube 10. In one aspect, the coupler is joined to the first end 12 of the guide tube as described herein. The coupler 22 has a small diameter portion 24, a flare or tapered transition portion 26, and a large diameter portion 28 at its second end. The small diameter portion is closely received over the guide tube first end. The large diameter portion includes a pair of outwardly extending lugs 30A and 30B that form a portion of a locking assembly to be described in greater detail below. The coupler is also hollow, defining a continuous internal cavity that extends from a first or upper end 32 to a second or lower end 34. The internal cavity is enlarged at the upper end to accommodate an interconnection between the shaft and a handle, and, if desired, to provide an orifice for receiving a spout on a fluid container, such as an oil container. For example, the spout of a standard quart of oil will fit in this enlarged upper end. Alternatively, the enlarged upper end may be dimensioned to receive a different sized oil container. It will be appreciated, however, that the enlarged upper end will eliminate use of a funnel in many instances.

Dipstick assembly C includes a plastic molded handle assembly 50, an elongated relatively stiff, yet bendable shaft 52 such as the stranded wire rope illustrated in the drawings (e.g., FIGS. 3, 8 and 11), and a fluid level indicator blade 54. The shaft 52 is rotatably mounted within plastic molded handle assembly 50, e.g., the shaft 52 can rotate and flex while being inserted along the typically non-linear length of the stationary tube. The handle 50 includes gripping portion 56 connected to a hollow cylindrical base 58 by a neck 60 of reduced dimension. The gripping portion preferably has a pair of knobs 62A and 62B extending outwardly and obliquely from the neck 60. The base 58, on the other hand, has a pair of slots 64A and 64B defined therein. In one specific aspect, each slot extends entirely through the base sidewall and is of a generally curvilinear conformation. The slots have an opening at one end along lower edge 66 of the base and a locking seat 68 at the other end of the curvilinear slot. Each of the curvilinear slots 64A and 64B is defined so as to have an axial portion aligned approximately with the shaft, and likewise the tube assembly B, and positioned adjacent the lower edge 66 of the base 58, and a generally transverse portion at the other end of the slots and in which locking seat 68 is defined.

The combination of slot 64A and 64B with lugs 30A and 30B defines a locking mechanism or bayonet type interconnection where lugs 30A and 30B slide in slots 64A and 64B. Axial insertion of the handle over the lugs and a quarter turn causes the handle base to slide over the coupler 22 whereby the lugs 30A and 30B become positively engaged in corresponding locking seats 68.

Shaft 52 is associated with but not permanently joined, bonded, molded or glued, to handle assembly 50. Shaft 52 is provided within assembly 50 in a manner that achieves a secure interconnection. Fluid level indicator blade 54 is affixed to the other end of the shaft 52 by die casting (or alternatively, by a staked attachment fitting 70 or other suitable mechanical connection). The die cast construction eliminates tolerance stack-up problems associated with prior arrangements, reduces the number of components, and provides a smooth transition fitting that does not catch in the guide tube. The indicator blade 54 is typically rounded or pointed at its free end to allow for easy insertion into the coupler 22, through the guide tube 10, and through engine fitting 72. The indicator blade also includes indicia, such as shaded area 74A and arrows 74B and 74C on at least one of the faces of the blade, for indicating the fluid level when dipstick assembly C is inserted fully into stationary tube assembly B that extends from the engine fitting.

Engine fitting 72 is compression sealed or press fit within second opening 20 of the guide tube 10. Alternatively, the fit may be a tight seal, a threaded fitting, or other connector, or the fit may involve bonding, gluing, molding, or other means of sealably connecting. A lip 76 prevents engine fitting 72 from complete insertion into elongated guide tube 10. The opposite end of engine fitting 72 is attached or bonded to a fluid reservoir or tank, such as found in an internal combustion engine, where it is desirous to measure the fluid level within the reservoir. In one specific aspect, this engine fitting is made of steel and has a serrated outer surface 78 (although alternatively, the outer surface may be roughened, knurled, or of other texture).

With the engine fitting 72 connected to a fluid reservoir and providing access for dipstick assembly C, the opposite end of stationary tube assembly B, i.e., the coupler 22, is secured at a convenient location remote from engine fitting 72. The elongated through passageway that connects coupler 22 and engine fitting 72 thereby provides access to the fluid in the reservoir via dipstick assembly C. Specifically, fluid level indicator blade 54 is inserted through the coupler and guide tube 10 such that the free end of blade 54 is immersed into the fluid in the reservoir. It will be appreciated that since the shaft is bendable and rotatable, the guide tube can adopt twists and turns along its route and the dipstick assembly can accommodate the tortuous path. For the blade 54 to be fully inserted, handle 56 must engage and interlock with coupler 22 and lugs 30A and 30B extending therefrom. Specifically, lugs 30A and 30B align with the open end of slot 64A and 64B respectively, whereby the handle is further forced over the coupler 22 resulting in lugs 30A and 30B following the curvilinear shape of slots 64A and 64B until locked in locking seats 68. The result in the rotation by approximately 90° of the handle about the coupler 22 as lugs 30A and 30B move from the axial portion of the respective slots into the transverse portion and eventually the locking seat 68.

A seal 80 (FIG. 3) is located in the base of cavity 82, and preferably glued, bonded or otherwise affixedly seated within the cap. The seal provides a pressure lock seal when the dipstick assembly is fully received in the guide tube. This seal has sufficient elasticity to allow compression of the seal by the coupler 22. This bayonet type locking arrangement provides assurance that fluid level indicator blade 54 is properly positioned for accurate fluid level readings as well as providing a positive lock feature for assuring that handle 56 is locked to stationary tube assembly B. Moreover, the seal provides sufficient sealing capabilities to allow the engine, transmission, or other machinery to reach several atmospheres (preferably at least 1 to 1.5 atm.) of back pressure without leakage. In addition, when fully sealed, the seal prohibits contaminants from entering into the fluid reservoir where system integrity and reliability would be jeopardized, and prohibits unnecessary fluid loss from the assembly. When a compressible and resilient seal is employed, the seal functions to urge the handle and lugs into a locked position, e.g., locking the bayonet mechanism compresses the seal which in turn causes the seal to urge the handle into a locked position relative to the locking lugs.

In one aspect, the coupler 22 and guide tube 10 are fabricated from plastics while engine fitting 72 is manufactured of high heat tolerating metals or plastics. Handle 56 is typically a molded component to or in which flexible shaft 52 is directly molded, joined, pinned, or otherwise connected. The handle is dimensioned to overlie or encompass the coupler or spout in its locked position to prevent contaminants from entering the guide tube. In an alternative aspect of the invention, described below in connection with FIG. 10, the handle is inserted into the spout. Moreover, the use of plastics can reduce corrosive effects and provides an overall reduction in system weight. Yet another advantage of using plastic in forming a number of the components is that the system can be color-coded for ease of use by the customer. Blade 54 is fabricated from steel or other comparable metals or plastics and is attached to flexible and rotating shaft 52 by attachment fitting 70 as described above. It will be appreciated, however, that other suitable materials may be used without departing from the scope and intent of the subject invention.

FIGS. 4–5 illustrate another aspect of the subject invention. In this arrangement, a different configuration grommet 90 is shown. It, too is of annular construction and preferably includes a series of legs 92 disposed in generally parallel relation and extending across the entire width of the annular grommet. That is, the legs are separated by groves 94 so that the legs extend outwardly a minor dimension on the order of approximately 0.10 inch. An opposite face of the grommet 96 has a general planar conformation and fits within the base of the cavity defined by the handle. Thus, as will be appreciated, the grommet may be adhesively secured or be appreciated, the grommet may be adhesively secured or interference fit into the base of the handle and is adapted to engage against end 32 of the spout. The alternating legs and grooves on the face of the grommet that engages the end of the spout prevents a seal from being formed in this particular version, however, by forming the grommet from an elastomeric material such as neoprene, the positive locking capability described in association with the aspects of the invention illustrated in FIGS. 1–3, 10 and 12 is maintained. That is, the user encounters a positive lock feel as the lugs enter the locking seats in the end of the slots. The elastomeric nature of the grommet serves as an integral portion of the locking function as the lugs 30 extend through the grooves 64, 66 in the handle. Engagement is made between the handle and the end of the spout. The lugs then pass the over-center position in the groove and urge the handle outwardly while maintaining the compressed relationship and ensuring a locked condition between the handle and the guide tube.

FIGS. 6–8 illustrate yet another version of a seal 100 that provides all of the same features and benefits of those shown and described in the earlier embodiments. FIGS. 6 and 7 illustrate two similar grommet seals 100 so that like components will be referred to by like reference numerals with a primed suffix (') in FIG. 7. The grommet has an enlarged shoulder 102 at one end that is received in the base of the handle. The shoulder has an outer diameter sufficient to engage against the axial end of the spout and perform the combined sealing and locking function as described above. In addition, a seal is formed in a radial direction with the wall of the spout by providing a circumferentially continuous sealing bead 104 (FIG. 6) or pair of beads 104; 106 (FIG. 7). In these arrangements, the sealing bead(s) is (are) integrally formed as a part of the grommet seal to reduce the number of components, eliminate additional assembly, and provide for an assembly that meets close tolerance specifications. Thus, as best illustrated in FIG. 8, once the handle is in the locked and sealed position, terminal end of the spout is sealed against shoulder 102. In addition, the seal beads 104, 106 engage the radial inner wall of the spout to provide an enhanced seal. In these aspects or arrangements, the seals form an interference fit with the handle. Thus, the enlarged shoulder 102 is dimensioned to form an interference fit in the base of the handle in addition to being sized for engagement with the terminal end of the spout. In substantially all other respects, these arrangements are identical to the aspects described above.

FIG. 9 shows yet another aspect of the invention that provides both an effective seal and positive locking feature. Here, the grommet or seal 110 is integrally molded into the handle. The seal has an annular configuration that extends from the planar interior base of the handle. The seal is circumferentially continuous and has a tapered or flared radial outer face 112 that is dimensioned for sealing engagement with the spout. The tapered conformation serves the dual purpose of sealing the handle and spout, as well as providing the positive locking function described above. When the handle is in the fully locked position, the terminal end of the spout engages the integrally molded seal in the base of the cap in an axial direction and the tapered wall 112 sealingly engages the radial inner wall of the spout.

Referring now to FIG. 10, FIG. 10 illustrates a further aspect of the invention wherein handle 120 is inserted and lockable within opening 121 defined in expanded spout 122 on one end of tube 123. Handle 120, as illustrated, includes gripping knobs or areas 120A and 120B (handle 120 can alternatively include the gripping knobs illustrated in FIG. 8). Handle 120 has the previously described bayonet connection, except that handle 120 is inserted within spout 122 and engages locking lugs (not shown) protruding inwardly from the inner surface of spout 122. As the handle 120 is inserted into spout 122, a recessed area (not shown) and defined within shoulder 124 engages gasket 125. Gasket 125 is compressed against shoulder 124 and the interior base of spout 122 as handle 120 is inserted into spout 122. As handle 120 is inserted into spout 122 curvilinear channels 126 (having one open end) defined in side-wall 127 engage inwardly protruding locking lugs on spout 122. Locking lugs travel along channels 126 until reaching area 128 at the closed end of channels 126. A recess 129 defined at area 128 functions to secure the locking lugs in a locked position within channels 126.

Rotatable dipstick shaft 130 is carried along with handle 120 as handle 120 is inserted into spout 122. As described above, the distal end of rotatable dipstick shaft 130 has a blade (not shown) that is employed for measuring a fluid level. Rotatable dipstick shaft 130 is free to flex and rotate as it is inserted into spout 122 and travels along tube 123.

Referring now to FIG. 11, FIG. 11 illustrates a rotatable shaft 140 that is over-molded by a dipstick handle such as illustrated in FIGS. 1–3 and 8–10. The rotatable shaft 140 is normally cleaned and polished to have smooth surface thereby enhancing the ability of shaft 140 to rotate within a dipstick handle. Shaft 140 has at least two chamfered regions 141A and 141B. These regions enhance the molding about shaft 140 as well as prevent shaft 140 from being pulled out of a handle. These regions can have any desirable configuration such as a flatten or nail head structure, semi-circular, among other configurations that permit rotation and prevent pull-out.

Shaft 140 also includes chamfered region 142. A blade (not shown) having a fluid level indicator at its distal end is connected to shaft 140 at chamfered region 142. The attachment can be achieved by any suitable method such as die-casting, staking, riveting, welding, among other conventional methods for attaching elongated metal articles.

Referring now to FIG. 12, FIG. 12 illustrates a retro-fit kit that can be employed for replacing conventional dipsticks with the inventive fluid level indicator. Kit 150 comprises compression sleeve 151 having threaded area 152 and compressive fitting 153. Kit 150 further comprises stationary tube member 154 and compression nut 155. Stationary tube member 154 typically comprises one of the stationary tubes illustrated in FIGS. 1, 3, and 8–10. The portion of compressive sleeve 151 in contact with stationary tube member 154 typically has a diamond knurled surface finish. In order to install kit 150 as a retrofit for an existing dipstick system, the existing dipstick system, which comprises the dipstick and the portion of the stationary tube contacting the existing dipstick, is removed, e.g., sawing, clipping, among other methods for cutting metal. Compressive nut 155 is slid over the existing stationary tube (after removing the original dipstick system). The stationary tube 154 including sleeve 151 are located in the stationary tube. Compressive nut 155 is contacted with threaded area 152 and tightened sufficiently to retain stationary tube 154 and sleeve 151 at a fixed position. Thereafter, the inventive dipstick system can be employed and locked into position by using the inventive bayonet connection.

Referring now to FIG. 13, shows fluid level indicator assembly 160 comprising a cap locking assembly 161 shown in FIGS. 1–3, 8–9 and 10 or in aforementioned U.S. patent application Ser. No. 09/947,314. Cap locking assembly 161 is attached to stationary tube 162. Stationary tube 162 is staked at 163 onto engine fitting 164. Tube 162 and engine fitting 164 are illustrated in greater detail in FIGS. 14–16.

FIG. 14 illustrates stationary tube 162 staked onto engine fitting 164. The end of stationary tube 162 opposite from the engine fitting 164 contains a knurled region 170. Region 170 is provided for enhancing the bond between tube 162 and an overmolded thermoplastic material (e.g., nylon 6,6) used in forming locking cap assembly 161. Staking region 163 can be formed by using any suitable machine such those supplied by EZ Crimp (e.g., containing 8 jaws and reducing the diameter of the stationary tube from 0.50 to about 0.475). The degree of diameter reduction and length of staking region can vary widely.

In one aspect of the invention, the cap assembly is connected to the stationary tube without the aforementioned over-molding process. The cap assembly can be attached via a threaded connection, contacting the interior of the stationary tube and expanding the stationary tube into contact the coupler or cap assembly, among other methods for affixing the cap assembly.

FIGS. 15 and 16 illustrate greater detail of tube 162 and engine fitting 164. Tube 162 can be fabricated from any suitable material such as ASTM J525, ASTM A513 Type 1 or 2 Alloy, among other materials capable of withstanding staking. Engine fitting 164 can also be fabricated from any suitable material such as 12L or 15 ASTM Alloy A108, lead free alloys, among other suitable materials. Tube 162 can be fabricated in accordance with any suitable method. One suitable method comprises shaping or bonding the tube into a desired configuration by employing commercially available machines such as compression bending, rotary draw bending, among other apparatus. Engine fitting 164 can be shaped by any suitable method such as by a conventional screw machine operations. Engine fitting 164 can include an optional knurled region 180 for enhancing bond formed by staking at region 163. Protuberance 181 about the exterior of engine fitting 164 is dimensioned to receive tube 162. Engine fitting 164 is maintained at a predetermined location with respect to the engine's fluid reservoir by grooves 182 defined upon the surface of the engine fitting. Engine fitting 164 can also include protuberances or ribs 183. Ribs 183 provide a surface that increases a bond between the engine fitting 164 and tube 162 when tube 162 is crimped or staked onto engine fitting 164. While any suitable method such as crimping or staking can be used for connecting the engine fitting and tube, the selected method should deform the tube and provide a permanent and leak resistant bond.

The invention has been described with reference to certain aspects. Obviously, modifications and alterations will occur to others upon a reading and understanding of this specification. For example, although the described aspects extensively use plastic as the preferred material of construction, it is understood that other materials can be used for selected components if so desired. Likewise, mere reversal of components that achieve substantially the same function and result are contemplated. For instance, the seal and locking features can be achieved by differently configured seals and/or lug and slot arrangements without departing from the present invention. It is intended to include all such modifications and alterations insofar as they come within the scope of the appended claims or the equivalents thereof.

The following is claimed:

1. An installation kit for replacing a previously installed fluid level indicator assembly comprising:
    a sleeve comprising a first end associated with a threaded area and a compression fitting,
    a coupler that engages a second end of the sleeve wherein said coupler has
    at least one lug extending therefrom,
    a handle comprising at least one slot wherein the slot comprises a generally axial portion and an axial portion and wherein said at least one slot engages said at least one lug,
    a shaft rotatably associated with the handle;
    a compressible member located in the base of the handle that engages at least an end face of the coupler; and,
    a compression nut that engages the threaded area of the sleeve wherein the compression nut is received upon a tube of the previously installed fluid level indicator assembly.

2. The kit of claim 1 wherein said at least one lug is outwardly extending.

3. The kit of claim 1 wherein said at least one lug is inwardly extending.

4. The kit of claim 2 wherein the shaft comprises wire.

5. The kit of claim 2 wherein the compressible member seals against the end face.

6. The kit of claim 1 further comprising a fluid level indicator blade attached to the shaft; and wherein the compressible member comprises a face for engaging the open end of the coupler and wherein the compressible member urges the handle toward a locked position.

7. The kit of claim 1 wherein the sleeve has a knurled section adjacent to the first end of the tube for receiving the coupler.

8. The kit of claim 1 wherein the compressible member provides a seal of capable of maintaining at least 1 atmosphere.

9. The kit of claim 1 wherein said compressible member comprises an annular seal that urges the handle and coupler into a locked position that is achieved when said at least one lug engages a locking seat.

* * * * *